Figure 1:
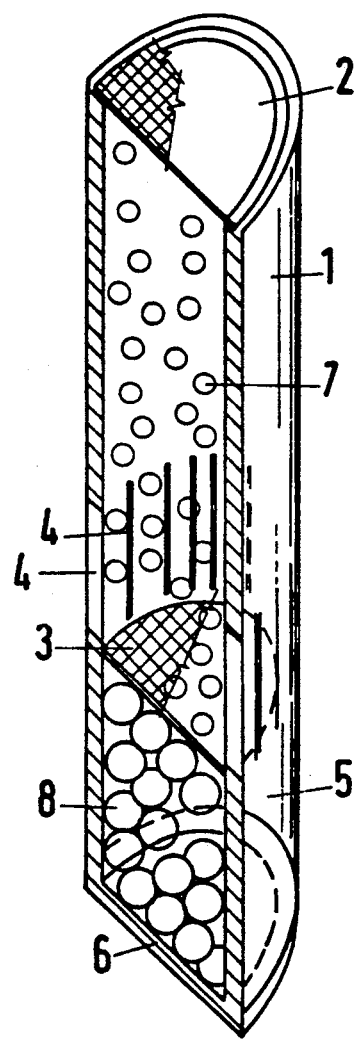

United States Patent [19]

Belz et al.

[11] Patent Number: 5,076,912
[45] Date of Patent: Dec. 31, 1991

[54] ION EXCHANGE DEVICE WITH CHAMBER HAVING INDICATOR MEANS

[75] Inventors: Rolf Belz, Hohenstein; Barthold Conradt, WI-Erbenheim, both of Fed. Rep. of Germany

[73] Assignee: BRITA Wasser-Filter-Systeme GmbH, Fed. Rep. of Germany

[21] Appl. No.: 529,929

[22] Filed: May 29, 1990

[30] Foreign Application Priority Data

Jun. 7, 1989 [DE] Fed. Rep. of Germany ....... 3918561

[51] Int. Cl.$^5$ ................... B01D 27/02; B01D 35/143; B01D 24/12
[52] U.S. Cl. ..................................... 210/94; 210/264; 210/282; 210/283
[58] Field of Search ................. 210/264, 266, 282, 93, 210/94, 95, 96.1, 283

[56] References Cited

U.S. PATENT DOCUMENTS

| 2,749,307 | 6/1956 | Ellison | 210/94 |
| 2,761,833 | 9/1956 | Ward | 210/94 |
| 2,778,798 | 1/1957 | Klumb et al. | 210/94 |
| 2,781,312 | 2/1957 | Klumb et al. | 210/94 |
| 3,327,859 | 6/1967 | Pall | 210/282 |
| 3,355,018 | 11/1967 | Smith | 210/94 |
| 3,497,069 | 2/2970 | Lindenthal et al. | 210/282 |
| 3,625,652 | 12/1971 | Fujimoto et al. | 210/282 |
| 3,630,683 | 12/1971 | Robb | 210/282 |
| 4,826,594 | 5/1989 | Sedman | 210/266 |
| 4,893,422 | 1/1990 | Mahlich et al. | 210/282 |

Primary Examiner—Stanley S. Silverman
Assistant Examiner—Cynthia L. Nessler
Attorney, Agent, or Firm—Michael L. Dunn

[57] ABSTRACT

In an apparatus for water treatment and comprising a pod containing a weakly acid or weakly basic ion exchanger and of which the inlet aperture is formed in the region of one end while the outlet orifice is formed in the region of the other end, in each case by a means which is permeable to liquid while retaining the ion exchanger, in order to render visible the fact that the ion exchanger is exhausted, there is in the region of the outlet orifice of the pod a chamber containing a strongly acid or strongly basic ion exchanger with a color indicator bonded thereon and the walls of which consist at least partially of a transparent material.

26 Claims, 3 Drawing Sheets

ION EXCHANGE DEVICE WITH CHAMBER HAVING INDICATOR MEANS

Devices for water treatment, particularly for decarbonisation and dechlorination in households and industrial concerns are already known and take various forms. Relatively small units for household purposes often consist of a jug on which it is possible to place a funnel with a pod containing the treatment agent and projecting into the jug. The water to be softened is poured into the funnel and runs through the pod into the jug. It is possible to provide in the pod or instead of it an interchangeable cartridge which contains the water treatment agent.

As a water treatment agent for decarbonising the water, usually it is a weakly acid cation exchanger which is mainly used, such as one which is based on a polyacrylate, in order in particular to exchange a substantial part of the earth alkali cations for alkali or hydrogen ions. Additionally, the water treatment device may contain anion exchangers or adsorption agents such as activated charcoal, for the removal of chlorine and other impurities. Furthermore, the fillings of the water treatment device may contain sterilising agents such as silver or silver compounds. In the past, there was a problem that after a certain time of use, the ion exchanger had to be replaced, being exhausted after a certain quantity of liquid had passed through it, the quantity depending upon the hardness and contamination of the water. The exhausted condition could not however be seen from the appearance of the ion exchanger. It was exchanged either by emptying the pod and refilling it from a top-up bag or better still by the exchange of a cartridge containing the ion exchanger.

It is indeed known to bind on ion exchangers colour indicators which produce a colour change at a specific pM value, but in the pM range of the exhaustion of the ion exchanger, the weakly acid cation exchangers needed for decarbonising the water do not produce a marked colour change which could be used as an indication of the fact that exchange was necessary, or alternatively the indicators cannot be fixed on the ion exchanger.

Thus, the problem on which the invention was based resided, in the case of devices for water treatment with a weakly acid and/or weakly basic cation exchanger, in finding an agent which indicates sufficiently clearly visually when the ion exchanger is sufficiently exhausted that it should be replaced by a fresh one.

According to the invention, with a device for water treatment, comprising a pod containing a weakly acid and/or weakly basic ion exchanger and of which the inlet aperture in the region of one end and the outlet orifice in the region of the other end are in each case formed by an arrangement which is permeable to liquids but which retains the ion exchanger, is resolved in that the device is characterised in that in the region of the outlet orifice of the pod there is a chamber connecting with the interior of the pod such that the main flow through the device does not pass through the chamber the chamber containing a strongly acid or strongly basic ion exchanger with a colour indicator bonded thereon and the walls of which consist at least partially of a transparent material.

The aforesaid chamber in the region of the outlet orifice of the pod only requires to contain a quantity of strongly acid or strongly basic ion exchanger which is small in comparison with the quantity of the weakly acid and/or weakly basic cation exchanger in the pod, since it has been found that in consideration of the residual hardness of the water decarbonised in the pod, fractions of which penetrate the chamber, so the strongly acid or strongly basic ion exchanger will then in its entirety and in the case of the colour indicator bonded on it, give rise to a colour change when the weakly acid or weakly basic ion exchanger in the pod is used up. The colour change of the colour indicator bonded on the strongly acid or strongly basic ion exchanger can commence relatively early on in the region of the liquid-permeable separation between the interior of the sleeve and the chamber and can then gradually propagate towards the end of the chamber which is remote from the pod. The exhausted condition is reached when the colour change has taken place at the remote end. For this reason, it is expedient for at least the region of the chamber which is remote from the ion exchanger filling in the pod to consist of a transparent material, since the colour change in this area is the criterion for the need to exchange the pod.

Since all devices for water treatment usually consist of a synthetic plastics material, it is possible to use a transparent synthetic plastics material either for the whole of it or only for the critical end of the chamber.

If mention is made here of a water treatment device, then this may be an appliance comprising a funnel with a pod mounted on it. Expediently, however, this device is a cartridge in pod form which is for instance so inserted into a funnel appliance or some other appliance such as a steam iron that the user is able to see the end of the chamber which is critical for exchange of the cartridge. The filter cartridge according to the invention can be inserted into an appliance vertically or horizontally. In the case of funnel appliances, the cartridge will generally be inserted vertically but with an iron, it will be inserted horizontally so that the critical end of the chamber projects from the water tank of the iron.

It is possible to use as strongly acid cation exchangers for the chamber according to the invention for example those which are styrene based, such as sulphonated styrene divinylbenzene copolymers or styrene acrylic acid copolymers. The colour indicator bonded on them, can, as is well known, be for example phenolphthalein, phenolphthalein being particularly preferred because of its colour change from colourless to red, clearly showing the consumption of ion exchanger. As strongly basic anion exchangers, it is possible for example to use those with quaternary ammonium groups. The colour indicator bonded on them may for instance be thymolphthalein.

Preferably, the pod contains a weakly acid ion exchanger and the chamber a strongly acid ion exchanger.

The chamber for the strongly acid or strongly basic cation exchanger can be constructed in various ways in the region of the outlet orifice of the pod. For example the pod may have its outlet orifice at its end and in the direction of through-flow, upstream of this end, it may have a lateral liquid communication with the chamber containing the strongly acid or strongly basic cation exchanger. In this case, for example the water to be cleaned flows through the weakly acid cation exchanger in the pod from the inlet end in the region of one end of the pod to the outlet orifice at the other end, a small part of the water decarbonised in the process passing through the lateral apertures upstream of the outlet orifice into the chamber containing the strongly acid cation exchanger so that the main flow through the device does not pass through the chamber. According to the degree of residual hardness of this water, so gradually the strongly acid cation exchanger in the chamber will be used up, producing a colour change. When the strongly acid cation exchanger in the chamber has been completely consumed, which indicates that also the weakly acid cation exchanger in the pod is sufficiently consumed that it has to be changed, this shows itself in a complete colouring, in the case of phenolphthalein it is a red colouring, of the strongly acid cation exchanger in the chamber. Therefore, it is sufficient to watch that end of the chamber which is farthest removed from the weakly acid cation exchanger. When the colour change there becomes visible, this is a criterion for the necessary exchange of the ion exchanger. As a general rule, then, the cartridge which consists of the pod and the chamber, will be taken out of the apparatus, thrown away and replaced by a fresh one. The same happens with weakly basic or strongly basic anion exchangers, a colour change from coloured to colourless also being possible. Also, a combination of weakly acid and strongly basic or weakly basic with strongly acid ion exchangers is possible.

Conversely, the disposition of the chamber with the for example strongly acid cation exchanger may also be aligned with the pod. In this case, the pod may have in the region of its outlet end outlet orifices in its side wall through which the softened water can pass, the orifice end being formed by an arrangement which is permeable to liquids and adjacent to which is a beaker-shaped chamber with the strongly acid cation exchanger. In this case, the main flow emerges laterally from the pod, while a small part of the softened water enters the beaker-like pod and produces the same effect as in the above-described embodiment. In this case, at least the bottom of the beaker-shaped chamber is made from transparent material, since this bottom is the end of the pod which is remote from the weakly acid cation exchanger of the pod, in the region of which the colouring of the strongly acid cation exchanger is critical for the moment of exchange.

If such a pod, for example in the case of irons, is to be inserted horizontally into the water treatment device, then the strongly acid cation exchanger in the chamber is consumed more rapidly in the bottom portion, since the upper portion may from time to time contain no water. In order to achieve as far as possible an even colour change over the critical end face of the chamber which is farthest removed from the ion exchanger in the pod, it is expedient in such cases for the liquid-permeable separating wall between the pod and the chamber to be obliquely disposed, so that the chamber filling of strongly acid cation exchanger has in the bottom portion a greater thickness than in the upper portion, so that the differing rates of consumption of the strongly acid cation exchanger as far as the filter end is compensated.

The liquid-permeable means which retain the ion exchanger particles may for example be filter plates, perforated plates or slotted plates, woven filter fabric or filter fleeces and in the case of the lateral outlet filter orifices, apertures or slots in the side wall of the pod. The special construction is not critical to the thought underlying the invention so long as sufficient liquid can pass through these filter plates, perforated plates, slotted plates woven, filters or fleeces while the ion exchanger particles are completely retained. An expediently constructed filter plate and its manufacture are described in DE-PS 2 220 656.

The ion exchangers are preferably in particle form but they may also be liquid-permeable blocks.

Figure 2:
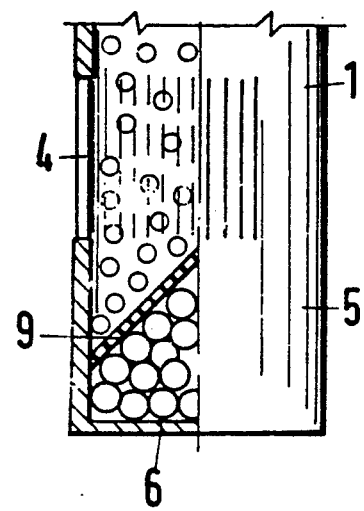
Figure 3:
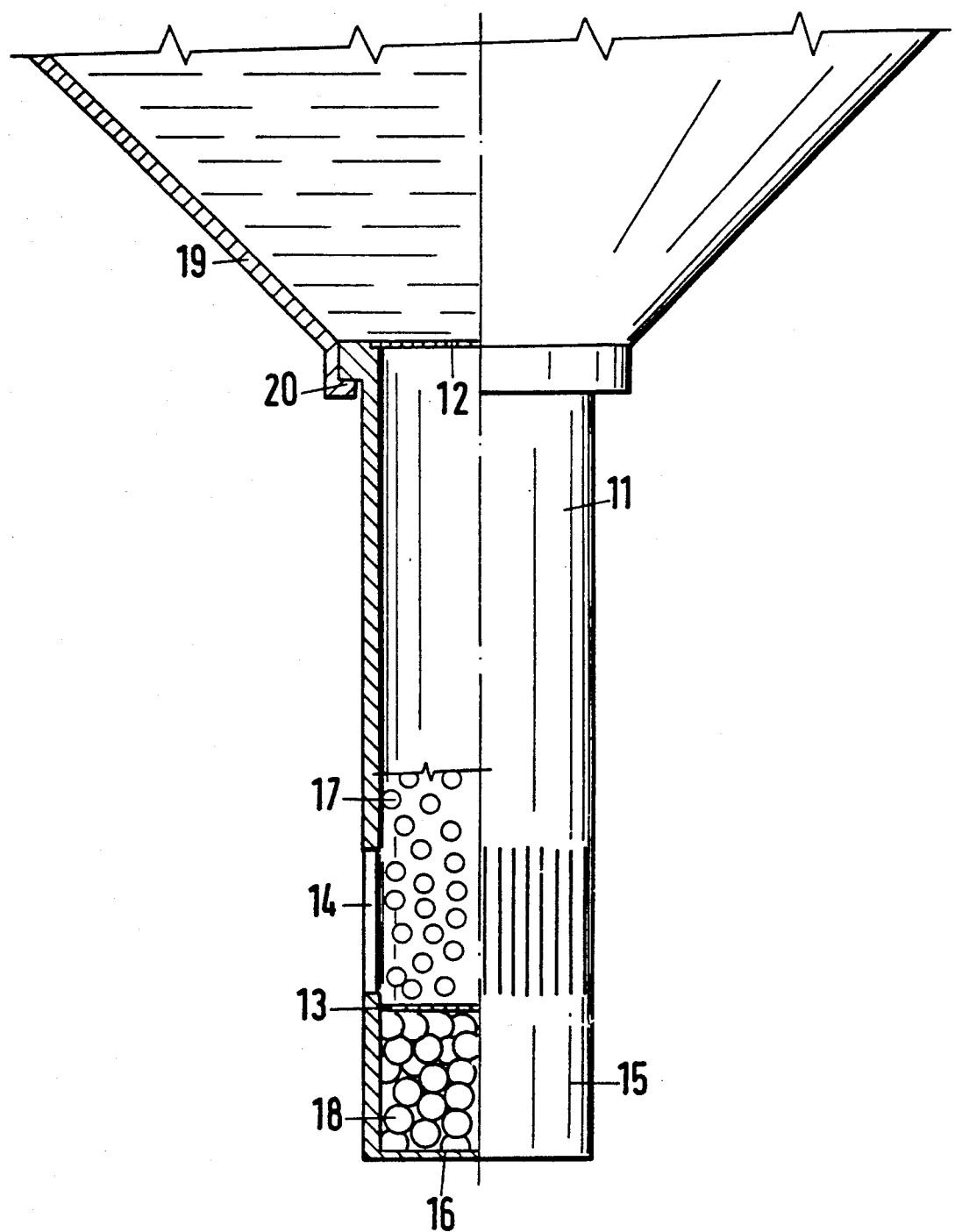
Figure 4:
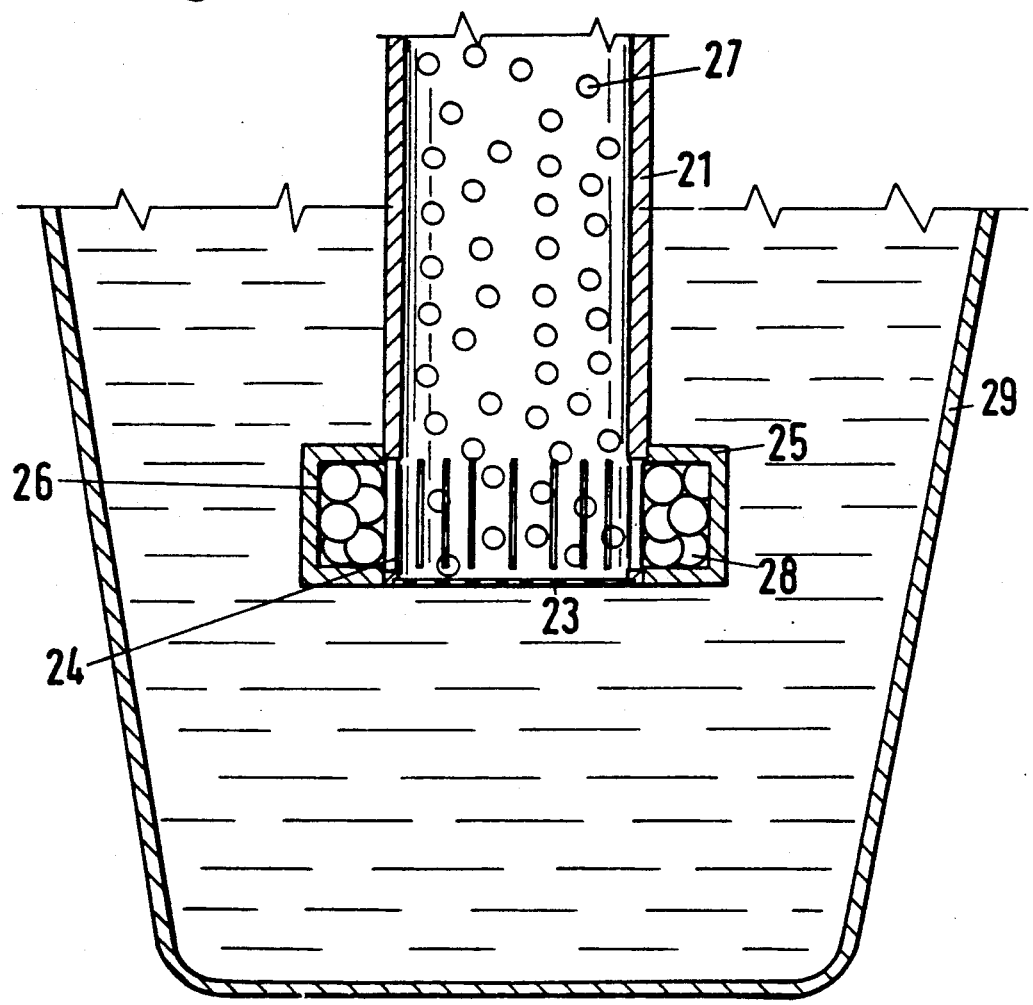

In the accompanying drawings:

FIG. 1 is a vertical section through a perspective view of a filter cartridge according to the invention, FIG. 2 is a partially vertically sectional front view of the bottom end of a modified form of such a filter cartridge for use in a horizontal position, FIG. 3 is a partially vertically sectional front view, broken away in the upper part, of a filter appliance provided with a funnel and FIG. 4 is a vertical section through the bottom end of another embodiment of a filter appliance according to the invention, immersed into the bottom end of the receiving container.

In FIG. 1, the filter cartridge consists of a cylindrical pod 1 bounded by an upper filter plate 2 serving as an inlet aperture and another filter plate 3. In the region of the lower filter plate 3, the cylindrical wall of the pod 1 has slots 4 which are parallel with one another and which are permeable to liquids. The space bounded by the pod 1 and the filter plates 2 and 3 is filled with a weakly acid cation exchanger in particle form. The slots 4 and the filter apertures in the filter plates 2 and 3 are so dimensioned that they retain the particles of weakly acid cation exchanger. The particles of weakly acid cation exchanger are identified by reference numeral 7.

The bottom filter plate 3 separates the interior of the pod 1 from the beaker-shaped chamber 5 with the closed bottom 6. This chamber is filled with particles of a strongly acid ion exchanger 8. The filter cartridge illustrated in FIG. 1 is intended particularly for a vertical through-flow from the top downwards.

For horizontal fitment of such a filter cartridge, it is particularly suitable to use the modified form shown in FIG. 2 which differs from the embodiment in FIG. 1 in that the filter plate 9, in contrast to the filter plate 3 in FIG. 1, is obliquely disposed. For horizontal fitment, the left-hand side of the chamber 5 will be moved upwardly so that the thickness of the layer of strongly acid cation exchanger in the chamber 5 between the filter plate 9 and the bottom 6 is greater in the bottom portion than it is in the upper portion. In both embodiments, shown in FIGS. 1 and 2, at least the bottom 6 of the chamber 5 is made from a transparent material so that a colour change in the area immediately behind it is readily discernible.

The embodiment according to FIG. 3 is structurally similar to that in FIG. 1 but here it is a filter cartridge which is intended for use in a funnel apparatus. For this purpose, the upper end of the pod 11 which incorporates the inlet aperture in the form of the filter plate 2, comprises an annular flange which rests on a shoulder 20 at the bottom end of the funnel 19 so that the water poured into the funnel 19 flows through the filter plate 12 and into the pod 11.

The pod 11 is filled with weakly acid cation exchanger 17. The outlet orifice is in turn constituted by lateral slots 14. The chamber 15 with the strongly acid cation exchanger 18 and with transparent closed bottom 16 is adjacent the sleeve 11 via the filter plate 13.

In the embodiment illustrated in FIG. 4, the pod 21 extends through as far as the bottom end face which consists of the filter plate 23. The pod 21 of which the drawing only shows the bottom end, is filled with weakly acid cation exchanger 27. The water emerging from the filter plate 23 after being softened passes into the receiving container 29 of which likewise only the bottom end is shown.

Upstream of the filter plate 23 in the direction of through-flow the pocket 21 has an encircling row of slots 24 which connect the interior of the pod 21 to the interior of the annular chamber 25 in which there is a strongly acid cation exchanger 28. In this case, at least the annular wall 26 of the chamber 25 must consist of transparent material so that the colour change immediately behind this annular wall can be made visible at the end of the chamber 25 which is remote from the pod 21.

We claim:

1. A liquid treatment device comprising:
   (a) pod means for containing a weak acid or weak base ion exchange material;
   (b) inlet means mounted to said pod means for the inlet of liquid into said pod means;
   (c) outlet means, to outlet said liquid from said pod means, mounted to said pod means at a remote position, on said pod means, from the position of said inlet means;
   (d) weak acid or weak base ion exchange material, which functions to treat said liquid, retained within said pod means;
   (e) means for retracting said weak acid or weak base ion exchange material within said pod means, said means for retaining which are permeable to liquids;
   (f) chamber means in the region of said outlet means laterally from or aligned with said pod means and connecting with the interior of said pod means such that the main flow through said device does not pass through said chamber means, at least one wall of said chamber means comprising, at least partially, a transparent material;
   (g) within said chamber means a small amount of strong acid or strong base ion exchange material in comparison with the quantity of the weak acid or weak base ion exchange material in the pod, said strong acid or strong base ion exchange material having bonded thereto an indicator means which functions by changing its colour at a predetermined pH; and
   (h) means for separating said strong acid or strong base ion exchange material from said weak acid or weak base ion exchange material, said means for separating providing communication of liquid between said strong acid or strong base ion exchange material and said weak acid or weak base ion exchange material.

2. The invention of claim 1 wherein said liquid is water.

3. The invention of claim 1 wherein said weak acid ion exchange material and said strong acid ion exchange material are in particle form.

4. A water treatment device, containing a weak acid or a weak base ion exchanger, comprising a pod which includes an inlet aperture in the region of one end and an outlet aperture in the region of the other end, said inlet aperture and said outlet aperture which comprise liquid permeable means which are both permeable to liquids and which retain said weak acid ion exchanger, wherein in the region of said outlet aperture of said pod, there is a chamber connecting with the interior of said pod such that the main flow through said device does not pass through said chamber, said chamber containing a strong acid of strong base ion exchanger, with a colour indicator bonded to said strong acid ion exchanger, at least one wall of said chamber which comprises, at least partially, a transparent material wherein said liquid permeable means comprises at least one filter means disposed obliquely to the cross-sectional area of said pod.

5. A device according to claim 4, wherein it contains a weak acid ion exchanger in said pod and a strong acid ion exchanger in said chamber.

6. A device according to claim 4, wherein it contains at least one of said weak acid ion exchanger and said strong acid ion exchanger in particle form.

7. A device according to claim 4, wherein at its end said pod has said outlet aperture and upstream thereof, in the direction of flow, there is provided a lateral liquid communication means which functions to provide liquid communication with said chamber containing said strong acid or base ion exchanger.

8. A device according to claim 4, wherein said pod has said outlet aperture laterally preceding its one end and in that there is, adjacent said one end, said chamber containing said strong acid ion exchanger, said ion exchanger which is separated from said interior of said pod by said liquid permeable means.

9. A device according to claim 4, wherein said liquid permeable means comprise plate means, selected from the group consisting of at least one filter plate, perforated plate and slotted plate, said liquid permeable means being disposed obliquely to the cross-sectional area of said pod, and a non-plate filter means, selected from the group consisting of at least one woven filter and fleece-like filter, said non-plate filter means being disposed obliquely to said cross-sectional area of said pod.

10. A device according to claim 4, wherein the portion of said chamber which is remote from said ion exchanger in said pod comprises said transparent material.

11. A device according to claim 4, wherein said strong acid ion exchanger in the chamber is one which is based on sulphonated styrene.

12. A device according to claim 4 wherein said strong acid ion exchanger in the chamber is one which has quaternary ammonium groups.

13. A device according to claim 4, wherein said strong acid ion exchanger in said chamber comprises phenolphthalein bonded thereto.

14. A device according to claim 4, wherein said strong acid ion exchanger in said chamber comprises thymolphthalein bonded thereto.

15. A device according to claim 4, wherein said chamber is separated from the interior of said pod by liquid permeable means which assists in retaining said ion exchanger in said pod.

16. A device according to claim 4, wherein said liquid permeable means comprises at least one perforated plate.

17. A device according to claim 4, wherein said liquid permeable means comprises at least one slotted plate.

18. A device according to claim 4, wherein said liquid permeable means comprises at least one woven filter.

19. A device according to claim 4, wherein said liquid permeable means comprises at least one filter fleece.

20. A water treatment device, containing a weak acid or a weak base ion exchanger, comprising a pod which includes an inlet aperture in the region of one end and an outlet aperture in the region of the other end, said inlet aperture and said outlet aperture which comprise liquid permeable means which are both permeable to liquids and which retain said weak acid ion exchanger, wherein in the region of said outlet aperture of said pod, there is a chamber connecting with the interior of said pod such that the main flow through said device does not pass through said chamber, said chamber containing a strong acid or strong base ion exchanger, with a color indicator bonded to said strong acid ion exchanger, at least one wall of said chamber which comprises, at least partially, a transparent material wherein at its end said pod has said outlet aperture and upstream thereof, in the direction of flow, there is provided a lateral liquid communication means which functions to provide liquid communication with said chamber containing said strong ion exchanger.

21. A device according to claim 20, wherein said liquid permeable means comprise at least one filter plate disposed obliquely to the cross-sectional area of said pod and at least one woven filter disposed obliquely to said cross-sectional area of said pod.

22. A device according to claim 20, wherein said liquid permeable means comprise at least one filter plate disposed obliquely to the cross-sectional area of said pod and at least one fleece-like filter disposed obliquely to said cross-sectional area of said pod.

23. A device according to claim 20, wherein said liquid permeable means comprise at least one slotted plate disposed obliquely to the cross-sectional area of said pod and at least one woven filter disposed obliquely to said cross-sectional area of said pod.

24. A device according to claim 20, wherein said liquid permeable means comprise at least one slotted plate disposed obliquely to the cross-sectional area of said pod and at least one fleece-like filter disposed obliquely to said cross-sectional area of said pod.

25. A device according to claim 20, wherein said liquid permeable means comprise at least one perforated plate disposed obliquely to the cross-sectional area of said pod and at least one woven filter disposed obliquely to said cross-sectional area of said pod.

26. A device according to claim 20, wherein said liquid permeable means comprise at least one perforated plate disposed obliquely to the cross-sectional area of said pod and at least one fleece-like filter disposed obliquely to said cross-sectional area of said pod.

* * * * *

UNITED STATES PATENT AND TRADEMARK OFFICE
CERTIFICATE OF CORRECTION

PATENT NO. : 5,076,912

DATED : December 31, 1991

INVENTOR(S) : Rolf Belz and Berthold Conradt

It is certified that error appears in the above-identified patent and that said Letters Patent is hereby corrected as shown below:

On the title page item [75] Inventors: the second inventor "Barthold Conradt" should --Berthold Conradt--.

Signed and Sealed this

Fifth Day of May, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,076,912
DATED : December 31, 1991
INVENTOR(S) : Rolf Belz and Barthold Conradt It is certified that error appears in the above-identified patent and that said Letters Patent is hereby corrected as shown below:

Column 5, line 26 of Claim 1, "retracting" should read --retaining--.

Signed and Sealed this

First Day of June, 1993

Attest:

MICHAEL K. KIRK

Attesting Officer

Acting Commissioner of Patents and Trademarks